United States Patent [19]

Kashiro et al.

[11] 4,209,481
[45] Jun. 24, 1980

[54] PROCESS FOR PRODUCING AN ANISOTROPICALLY ELECTROCONDUCTIVE SHEET

[75] Inventors: Yoshikazu Kashiro; Kenji Matsugasako; Shunro Kataoka, all of Otsu, Japan

[73] Assignee: Toray Industries, Inc., Tokyo, Japan

[21] Appl. No.: 6,009

[22] Filed: Jan. 24, 1979

Related U.S. Application Data

[60] Division of Ser. No. 900,183, Apr. 26, 1978, abandoned, which is a continuation-in-part of Ser. No. 788,751, Apr. 19, 1977, abandoned.

[30] Foreign Application Priority Data

| | | |
|---|---|---|
| Apr. 19, 1976 [JP] | Japan | 51-43598 |
| Apr. 19, 1976 [JP] | Japan | 51-43599 |
| Sep. 9, 1976 [JP] | Japan | 51-107239 |
| Oct. 27, 1976 [JP] | Japan | 51-128231 |

[51] Int. Cl.$^2$ .......................... B29C 5/00; B29D 3/02
[52] U.S. Cl. ........................................ 264/24; 29/877; 264/108; 264/272; 264/299; 264/338
[58] Field of Search ................. 428/389, 900, 294; 264/108, 24, 299, 338, 271, 272; 425/174.8 R, 174.8 E; 29/629, 630 B

[56] References Cited

U.S. PATENT DOCUMENTS

| | | | |
|---|---|---|---|
| 3,073,732 | 1/1963 | Hunsdiecker | 264/108 |
| 3,359,145 | 12/1967 | Salyer | 156/1 |
| 3,507,938 | 4/1970 | Hunsdiecker | 264/108 |
| 3,564,654 | 2/1971 | Steingroever | 264/24 |

*Primary Examiner*—W. E. Hoag
*Attorney, Agent, or Firm*—Miller & Prestia

[57] ABSTRACT

An anisotropically electroconductive sheet of a non-electroconductive elastomer and electroconductive wires which have a length substantially the thickness of the sheet. The electroconductive wires are oriented from each other and are formed into patterned wire groupings, which are in turn formed into patterns. The wires in the groupings are parallel in the directions of the sheet thickness, and the wires are spaced from each other in the wire groupings, and are thereby electrically insulated from each other.

10 Claims, 13 Drawing Figures

FIG. 10A.
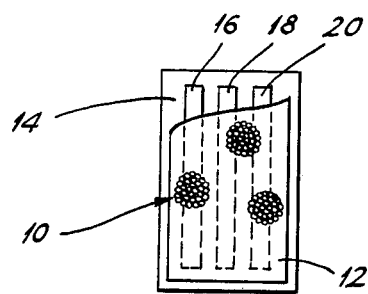
FIG. 10B.
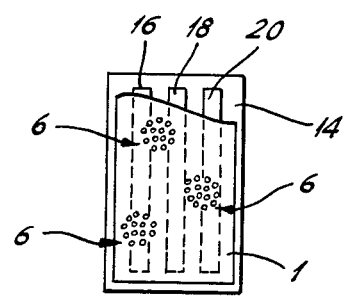
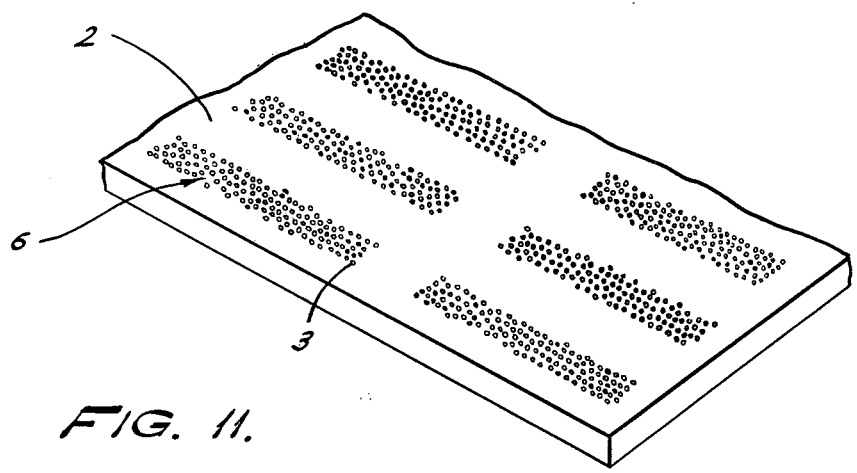
FIG. 11.
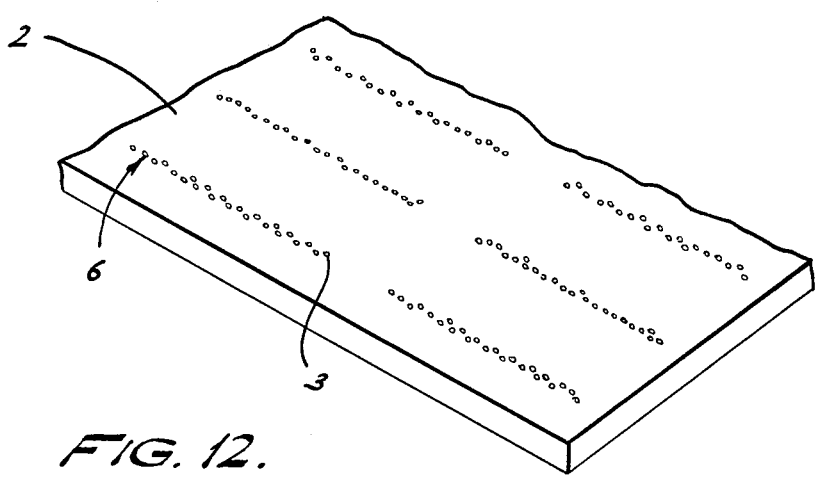
FIG. 12.

PROCESS FOR PRODUCING AN ANISOTROPICALLY ELECTROCONDUCTIVE SHEET

This application is a division of application Ser. No. 900,183, filed Apr. 26, 1978 which is a continuation-in-part of application Ser. No. 788,751, filed Apr. 19, 1977 both being now abandoned.

BACKGROUND OF INVENTION

This invention relates to an anisotropically electroconductive sheet and a process for producng the same. More particularly, this invention relates to an elastomeric sheet which is electroconductive in its thickness direction (Z direction) and non-conductive in the plane direction (XY direction), and to the process for producing same.

The aforementioned anisotropically electroconductive sheets are useful as connectors of electronic circuits, since they can connect many electrodes which are independently located on the directly opposite sides of the electroconductive sheet. They are especially useful as connectors in electronic calculators, cameras, wrist watches, etc., where circuit elements are confined to very limited spaces.

An elastomeric sheet which comprises alternate layers of conductive and non-conductive silicone rubber has been used in the past as an electronic connectors. However, use of this elastomeric sheet requires some restrictions on the disposition of the electrodes.

There is another type of elastomeric sheet that is known which has metal particles dispersed in the elastomer. This sheet is non-conductive in the uncompressed state but it becomes conductive only when it is compressed because the metal particles then contact each other. However, this conductivity depends on pressure and it is difficult to maintain the appropriate pressure for the period of time conductivity is needed.

On the other hand, U.S. Pat. No. 2,189,340 describes a conductive sheet which is used as an electrode for a television Braun tube. This sheet is made by orienting conductive wires or fibers in a transparent matrix, such as glass or rosin, and then hardening the matrix. Although this sheet is anisotropic, it is unsuitable for use as an electronic connector, since it is too hard. Also, this particular conductive sheet may have a rough surface which makes uniform electrical contact between conductors difficult.

BRIEF SUMMARY OF THE INVENTION

An object of this invention is to provide an anisotropically electroconductive sheet that is useful as an electronic connector. Another object of this invention is to provide a process for producing the anisotropically electroconductive sheet.

According to this invention, an anisotropically electroconductive sheet is provided which comprises a non-conductive elastomeric sheet and conductive fibrous wires having a length essentially the same as the thickness of the sheet, which are spaced from each other, i.e., electrically insulated from each other, and stand in the thickness direction with both ends exposed at each surface. A plurality of these wires are grouped to form wire groupings. The wire groupings are each in the form of a pattern and the plurality of wire groupings are in turn formed into a pattern.

This invention also provides for a process for producing an anisotropically electroconductive sheet by:

(a) mixing ferromagnetic fibrous wires of a predetermined length into a non-conductive fluid matrix;

(b) pouring the above mixture into a mold, which has two spaced parallel planes which are spaced father apart than the length of the fibrous wires;

(c) generating a magnetic field in the direction perpendicular to the planes thereby orienting the fibrous wires in the matrix in the direction of the magnetic field;

(d) claiming the distance between the two planes so that the space between the two planes is essentially the same as the length of the wires, and, (e) hardening the liquid matrix.

BRIEF DESCRIPTION OF THE DRAWINGS

FIGS. 10A and 10B show how the wire groupings of the present invention, as shown in FIG. 10B, prevent the shorting out of electrical conductors as was the case in the prior art shown in FIG. 10A.

FIGS. 11 and 12 show further patterns of the wire groupings used in the present invention.

DETAILED DESCRIPTION OF THE INVENTION

Figure 1:
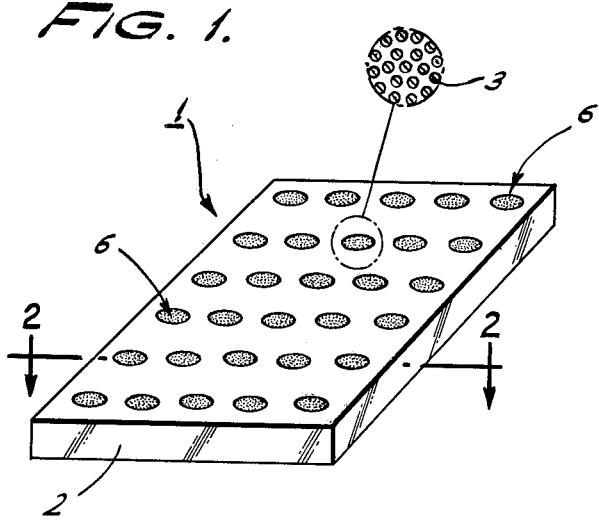
FIG. 1 shows a perspective view of the anisotropically electroconductive sheet of the present invention having a plurality of wire groupings.
Figure 2:
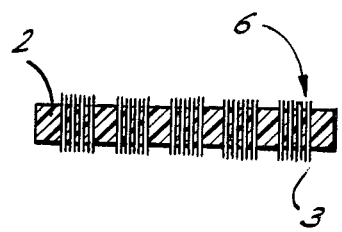
FIG. 2 is a cross sectional view of the sheet of FIG. 1 taken along line 2—2.

As shown in FIGS. 1 and 2, the anisotropically electroconductive sheet 1 of the invention, includes an elastomeric sheet 2, as the matrix with electrically conductive wires 3 dispersed and arranged in the elastomeric sheet 2. Elastomeric sheet 2 is of an electrically non-conductive material. Electroconductive wires 3 are oriented in the thickness direction of elastomeric sheet 2 and are spaced from each other. A plurality of the conductive wires 3 are formed into discrete wire groupings 6, of a predetermined pattern, many of these groupings 6 are formed in turn into a predetermined pattern. Since the wires 3 of each wire grouping 6 are spaced from each other and because the elastomeric sheet 2 is electrically non-conductive, the wires are thus electrically insulated from each other. The importance of this electrical insulation between wires will be subsequently discussed, with respect to FIGS. 10A and 10B.

Figure 4:
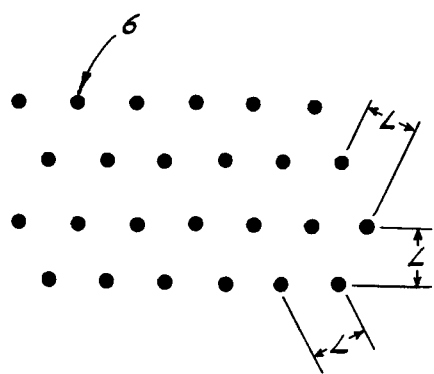
FIG. 4 is a plan view showing a pattern arrangement of the wire groupings.

FIG. 4 is an example of a pattern in which the wire groupings 6 are arranged hexagonally. The length of conductive wires 3 is essentially the same as the thickness of elastomeric sheet 2, and typically both ends of the wires are exposed on the surface of the sheet 2. As noted the conductive wires 3 provide electrical conduction in the thickness direction of the elastomeric sheet 2. However, in the plane direction the sheet 2 is non-conducting because the conductive wires 3 extend in the direction orthogonal to the plane direction (i.e. the thickness direction) and are electrically insulated from each other.

Figure 3:
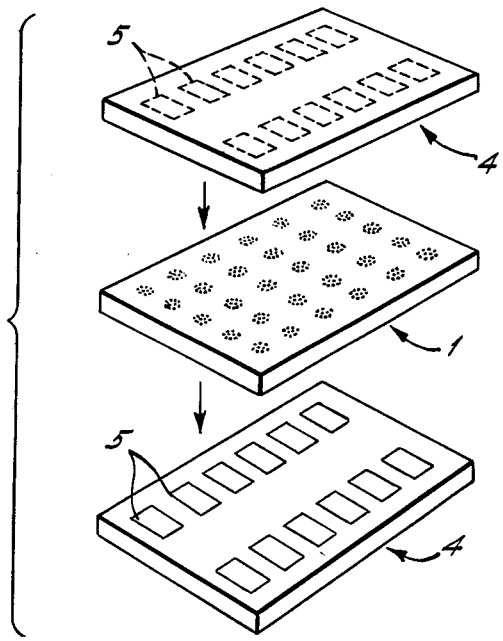
FIG. 3 shows the anisotropically electroconductive sheet used as a connector for electronic circuit elements.

As shown in FIG. 3, to utilize the electroconductive sheet 1 as a connector between electronic circuit elements, the sheet is inserted between two circuit elements 4, and is held in place by a light pressure, thereby making electrical contact between the terminals 5.

The matrix material of elastomeric sheet 2 should be electrically non-conductive, but the matrix material should also have fluidity so as to obtain the proper dispersion and orientation of the conductive wires 3. Furthermore, after hardening the matrix material should be in the solid state at room temperature. The term "hardening" means to either chemically curing or solidifying by cooling the melted material or fluid material. The sheet 2 should also be relatively elastic, so that when the elastomeric sheet 2 is used as an electrical connector, close electrical contact is obtained even if the contacted terminals have rough surfaces or foreign particles are on their surfaces. Therefore, rubber-like materials such as silicones or polyurethanes are preferably used. These materials are available as liquid monomers or prepolymers. The materials which are used as the electroconductive wires include metals such as iron, nickel, cobalt or their alloys, which have good magnetic and electroconductive properties. Fibers such as glass or synthetic fibers, which are themselves not electrical conductors, can be coated with a metal, such as nickel, or other good electrical conductors and be used as the electroconductive wires 3 of the present invention.

There are no special restrictions on the wire diameter, however, the diameter is preferably less than 50 microns.

The length of the conductive wire 3 is important in order to obtain stable conductivity throughout the sheet 2. The length should be at least substantially equal to the thickness of the sheet. That is, the conductive wire 3 length is typically about 0.9~2.0 times the thickness of the sheet 2. However, the wire length is preferably about 1.0~1.5 times, and more preferably, about 1.0~1.1 times the thickness of the sheet 2. If the wire length is shorter than 0.9 times the sheet thickness, the conductive efficiency of the sheet 2 becomes extremely poor. It the length is greater than 2 times the sheet, the fibers become entangled and adversely affect the conductive properties of the sheet 2. Most preferably, the length of the conductive wire 3 is slightly greater than that of the sheet 2 and both ends of the conductive wire 3 slightly protrude fromthe surfaces of the sheet 2. If the conductive wire 3 length is just equal to or smaller than the thickness of the sheet 2, the wire 3 may at times be covered by a thin layer of the matrix material. Such a condition, causes a high, unstable contact resistivity, requires a high holding pressure and causes the ends of the conductive wires 3 to sink into the matrix when it expands thermally at high temperatures.

There is a degree of restriction on the quantity of the conductive wires 3 in the matrix. When the quantity of the conductive wires 3 exceeds a certain amount, the wires may become entangled during their orientation in the matrix. This causes irregular conductive paths which are detrimental to the conductive performance of the sheet 2. The conductive wires 3 are contained in the matrix at about 0.01~5.0 volume percent, preferably about 0.05~1.0 volume percent of the matrix. The content of the conductive wires 3 also relates to the length of the wires 3. This relationship is given by the following formula:

$$Y \leq 200/X$$

wherein X is the thickness of the sheet (mm) and is typically within 0.1 and 2.0 mm, and Y is the number of the conductive wires 3 in 1mm$^2$ of the sheet 2. For example, when the conductive wires 3 are 0.5 mm long and 6 microns in diameter, and the sheet 2 is 0.5 mm thick, the maximum content of the conductive wires 3 is 1.13 the volume percent according to the above formula.

Figure 5:
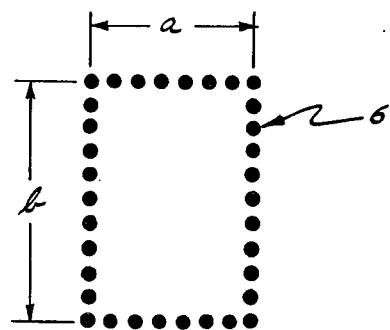
FIGS. 5–8 show further patterns of the wire groupings.
Figure 6:
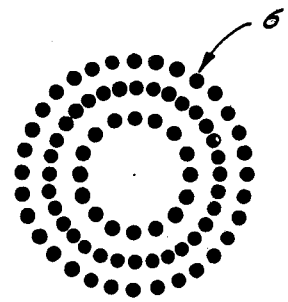
Figure 7:
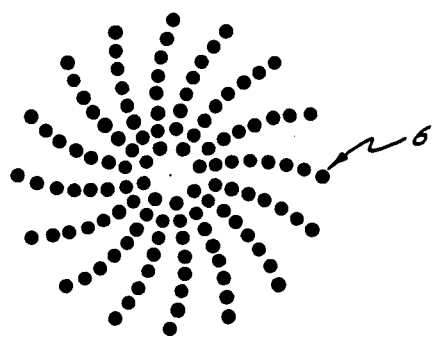
Figure 8:
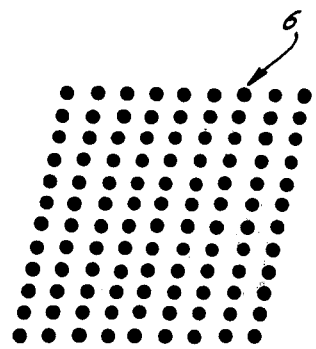
Figure 9:
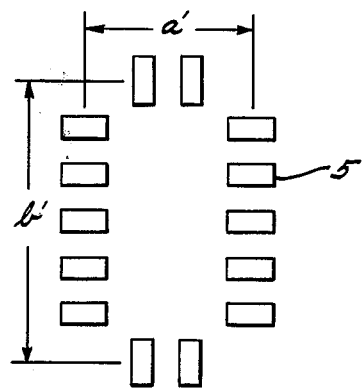
FIG. 9 is a plan view showing an example of a pattern arrangement of terminals of an electronic circuit element.

With regard to the pattern arrangements of the plurality of wire groupings 6, many various patterns of lattice, ring and other forms can be utilized besides the hexagonal pattern shown in FIG. 1. FIGS. 5–8 show some examples of such patterns. FIG. 5 shows a rectangular form, FIG. 6 shows a ring form, FIG. 7 shows a spiral form and FIG. 8 shows a parallel tetragon form. The pattern shown in FIG. 5 is especially useful for connection of circuit elements which have a terminal pattern as shown in FIG. 9.

The anisotropically electroconductive sheet 1 of the present invention has its conductive paths through the wire groupings 6 which are themslevs formed by a plurality of individual conductive wires 3. This ensures reliability of the electrical connection, because even if one of the conductive wires 3 is not making contact or is poorly conducting, the other wire 3 can conduct the electricity through the sheet. The plurality of wire groupings 6 can be arranged other than those described above and in the Figures, for the practice of the present invention.

As previously mentioned, the fact that the individual conductive wires 6 of the present invention are electrically insulated from each other is an advantage of the present invention over the prior art. The importance of insulating each of the wires 3 is subsequently discussed. In FIG. 10A a group of conductive wires 6 is shown with the wires adjacent and in contact with each other forming wire groupings 10 in a anisotropically electroconductive sheet depicted as 12. FIG. 10A shows a prior art anistropically elecroconductive sheet, where all of the wires of a single wire grouping are electrically in contact with each other. The elecroconductive sheet 12 is in contact with an electrical element 14 having conductive stripes 16, 18 and 20. Referring to FIG. 10B, the wire groupings 6 of the present invention are shown in the electroconductive sheet 1 of the present invention. The individual wires 3 of a wire grouping 6 of the present invention, are spaced from each other and are thus electrically insulated from each other. The electroconductive sheet 1 is also in contact with an electrical element 14 having conducting stripes 16, 18 and 20. As is quite apparent after examining FIGS. 10A and 10B, the advantage of the present invention is that there is no shorting out of the two conductive stripes, since all the wires 3 are electrically insulated from each other. Whereas, when a wire grouping 10 of the prior art over-laps and contacts two conducting stripes there is a shorting out between the wo conducting stripes. Therefore, it is quite advantageous to have the conductive wires 3 of the wire grouping 6 electrically insulated and separated from each other, as practiced in the present invention.

While the wire groupings 6 of the present invention have been shown having a cross-sectional pattern in the plane of the elastomer sheet 2 which is substantially circular in shape, it is anticipated by the present invention that the wire groupings 6 may be of patterns other than a circular pattern. Referring to FIGS. 11 and 12 the individual conductive wires 3 are shown in wire groupings 6 having patterns which are substantially rectangular, and which are substantially in the form of a line, respectively. It is certainly anticipated by the present invention that at times wire groupings of the patterns as depicted in FIGS. 11 and 12 could be advantageous over the circular pattern as previously shown. It is also anticipated by the present invention that other patterns of the wire groups 6 may be utilized in the practice of the present invention.

In the production of the anisotropically electroconductive sheet 1, a predetermined amount of cut wires having electroconductivity and ferromagnetic properties and of substantially equal, the same length as the thickness of the final sheet, are mixed with the starting liquid or prepolymer of the matrix elastomer. This mixture is contained in a mold in the form of a sheet and then the cut wires are oriented in the normal direction of the sheet, i.e. the thickness direction, by utilizing a magnetic field. The mixture is kept in this state until the starting liquid or prepolymer of the matrix elastomer is solidified into the form of the sheet 2.

One method of containing the mixture in the shape of a sheet is to pour the mixture into a cavity surrounded by sheets of thin polyester film with a ring-shaped spacer between the two polyester film sheets. Another method is to pour the mixture directly into a mold cavity formed by a set of electromagnetic plates with a frame between and spacing apart the plates. In this latter case, the surface of the plates may be engraved with a pattern and is preferably thinly coated with non-magnetic and chemically inactive material so that the solidified sheet can be easily removed from the mold, while maintanining the surfaces of the solidified sheet in a smooth condition.

One problem which arises in producing the sheet 2 of the present invention, is the entanglement of the wires when the matrix material is in a liquid state. The entanglement of the wires not only decreases the effective conductivity of the sheet 2 in the normal direction but also causes conduction in the surface direction of the sheet 2 which is most undesirable. Electroconductivity in the surface direction can be a fatal defect of the electroconductive sheet 2 when used as a connector, since it will result in the shorting-out of electrical elements.

It has been discovered that by maintaining the thickness of the starting mixture during the wire orientation thicker than the final sheet thickness, the problem of entanglement is solved. After the orientation of the wires is complete, the thickness of the starting mixture is slowly reduced to the thickness of the final sheet and then the starting mixture is solidified. During this period, the orientation of fibers is maintained in the normal direction, i.e. in the direction of the sheet thickness. This method is effective not only for the prevention of entanglement, but also for improving the orientation of the wires. The length of the wires may vary within controlled tolerances, therefore, the thickness of the sheet must be fixed to the length of the shortest wire in order to maintain the ratio of the wires that project from the sheet surface high.

If the orientation of the wires is begun after the sheet thickness is made substantially equal to the length of the shortest wires, the longer wires will only be partially oriented and form undersirable inclined conductive paths through the sheet in the normal direction. As hereinbefore mentioned, if the wire orientation is started while the starting mixture is thicker than the final sheet thickness and after the orientation has been completed, when the thickness of the mixture is reduced, the longer wires do not create inclined conductive paths, although the wires may form curved conductive paths or protrude out of the surface of the sheet. Nevertheless, in this latter case, both ends of each wire are located on the same line normal to the sheet so that the conductive paths are kept substantially prependicular to the surfaces of the sheet.

In the above mentioned process, it is desirable to cover both surfaces of the plates or film sheets and contain the mixture with a soft and chemically inert layer. If the plate or film sheet surfaces are hard, the conductive wires may be bent when the distance between the two surfaces becomes narrower than the length of the longer wires. When the plate or film surfaces are covered with a soft material, even if the distances between the two surfaces become smaller than the length of the longer wires, the ends of the wires are not deformed. We can apply this method to obtain the vertically conductive sheet as shown in FIG. 2, in which the ends of the wires 3 extend out of the surfaces of the elastomeric sheet 2.

The soft layers applied to the plate or film sheet surfaces which contact the mixture are made of chemically inert material so that they do not react with the matrix liquid nor attach to the matrix sheet. The rheological property and the thickness of the soft inert layer depends on the molding temperature, the diameter, and length and rigidity of the wires 3.

It is preferable that the inert layer on the plate or film sheet be at least soft enough to permit the wire to project into the layer at least 1$\mu$ deep before the wire begins to bend. Many kinds of elastomers may be utilized, for example, polybutadiene nitrilebutadiene rubber, styrene-butadiene rubber, and certain kinds of plastics such as polyethylene, which become soft at lower temperatures. These soft inert layers are usually coated onto the surface of the plate or film used to retain the mixture in the shape of a sheet. Also, a soft, inert layer can be used that is merely laid on the surface of the plate or film sheet.

Another and more effective method to prevent entanglement of the conductive wires is to utilize a special kind of magnetic pretreatment. That is, to subject the sheet to a magnetic field which is inclined from the direction perpendicular to the sheet before the final orientation. One can further obtain better results by varying the degree of inclination of the magnetic field. For example, changing the degree of inclination of +45° to −45° repeatedly, has been found to give good results. The advantage of changing the degree of inclination of the magnetic field is subsequently discussed.

Some of the wires become attached to the surface of the containing plates or film sheets during the pouring of the starting mixture into the mold, and it is these wires which are not affected by a magnetic field in a direction perpendicular to the sheet. Therefore, they remain on the surface of the sheet after the starting mixture is solidified. By means of inclining the magnetic field, these wires are forced to stand up and become oriented to the direction normal to the sheet.

The varying of the inclination of the magnetic field causes the loosening of wire entanglements. The wire oriented in the inclined direction have more back and forth freedom of movement than the wires that are perpendicularly oriented to the sheet when the sheet is subjected to a varying of the inclination of the magnetic field. Varying the degree of inclination of the magnetic field causes the same effect as shaking the wires and has the effect on loosening the entanglement of the wires. The degree of inclination of the magnetic field to the normal direction of the sheet is not restricted but an inclination of more than 5°, and preferably more than 10°, is desirable.

By providing the mold with a magnetic plate having many regularly arranged surface protrusions, there can be obtained a regularly distributed pattern of wire groupings 6, for example, such as shown in FIG. 1. The force of the magnetic field is stronger in the region between two opposed protrusions than in the region between the valleys. Therefore, the ferromagnetic wires, which are distributed randomly in the matrix liquid, are gathered at the nearest protrusion and are then oriented in a direction perpendicular to the sheet.

The pattern of the individual wire groupings 6 and the pattern formed by the plurality of wire groupings 6 is decided by the pattern of the protrusions on the surface of the plates. Conventional methods, including etching and machining, may be used to form the protrusion pattern on the plates. The surface of the plates is made from a ferromagnetic material. It is possible to make the surface of the plates mechanically smooth by filling the hollow with non-magnetic material.

As discussed hereinbefore, in the anisotropically conductive sheet of the present invention, an elastomer is used as the matrix. Therefore, when used as an electrical connector that is held between two electrically conductive boards, the elastomeric sheet 2 is compressed and the reliability of the connection is increased by the elastic resilience force of the sheet 2. This reliability is not affected in any major degree by vibration or temperature because of the elastic resilience of the elastomeric sheet 2.

By the method of this invention, one can make an anisotropically elecroconductive sheet without wire entanglement and with both ends of each wire protruding out of the sheet surface. The anisotropically electroconductive sheet of the present invention provides high reliability as an electrical connector.

The following are some Examples of this invention and, of course, this invention is not restricted to these specific Examples.

EXAMPLE 1

A low temperature vulcanizable liquid silicone rubber is mixed with a 0.5 volume percent of cut stainless steel wires. The stainless steel wires have a 12μ diameter are 0.49 mm in average length with 0.02 mm standard deviation of length. The mixture is degassed in a vacuum and then fed into a cavity made by two sheets of 50μ thick polyester film with an aluminum spacer of 0.49 mm thickness between the polyester film sheets. The volume of the mixture is controlled to make the following kinds of sheet thicknesses, case (a) 0.47 mm; case (B) 0.70 mm and case (C) 0.70 mm.

The mold to be utilized in this present example comprises two steel plates spaced from each other. Each plate of the mold is attached to a pole of an electromagnet so that each plate acts as a magnetic pole, and a magnetic field is generated in the cavity between the two plates in the direction normal to the surfaces of the plates. Then the mold is heated to 60° C.

A pair of sheets of polyester film (a) is placed in the cavity of the mold and a starting mixture is poured between the two sheets. The volume of the material poured into the cavity is sufficient to provide an electroconductive sheet 0.47 mm in thickness. The mold is then closed until it is stopped by a spacer between the two polyester sheets providing a 0.47 mm cavity. Thereafter, the electromagnet, is activated to create a 3,000 Gauss magnetic field through the cavity. After 2 hours, an electroconductive sheet of silicone rubber (A), is taken out of the mold.

A second pair of sheets of polyester film (b) is placed in the cavity of the mold and a starting mixture is poured between the two sheets. The volume of starting material should be sufficient to provide an electroconductive sheet of 0.70 mm in thickness. At first the mold is closed to provide a cavity space of 1.0 mm. The electromagnet is then activated to create a 3,000 Gauss magnetic field through the cavity for 5 minutes. Thereafter, with the same strength magnetic field continued the mold is slowly closed until it is stopped by the spaer. After 2 hours an electroconductive sheet of silicone rubber (B) is taken out of the mold.

A third pair of sheets of polyester film (c) is placed in the cavity of the mold and is poured between the two sheets. The volume of the starting material should be sufficient to provide an electroconductive sheet of 0.70 mm in thickness. At first the mold is closed to provide a cavity space of 1.0 mm. Thereafter, the electromagnet is turned on to create a magnetic field of 3,000 Gauss through the cavity for 2 hours. Thereafter an electroconductive rubber (C) is then taken out of the mold.

As shown in Table 1, there are many differences between the three sheets. However, sheet (B) is the best of the three sheets in its electrical properties and in lack of wire entanglements: This illustrates the importance of:

(1) providing a cavity space greater than the desired thickness of the electroconductive sheet and
(2) controlling electroconductive sheet thickness with respect to the length of the electroconductive wires after the electroconductive wires have been oriented but before curing the sheet.

The results are shown in Table 1 as follows:

TABLE 1

| | Sheet (A) | Sheet (B) | Sheet (C) |
| --- | --- | --- | --- |
| Conductive wire entanglements | Many | Nothing | Nothing |
| Surface Conductivity of the sheet distance between electrodes is 0.6 mm) | Irregularly conductive | No conductivity | No conductivity |
| Resistances of the sheet in the direction normal to the sheet, i.e. in the direction of the sheet thickness | 0.02Ωcm | 0.015Ωcm | 1.3Ωcm |

EXAMPLE 2

Cut fibers of graphite are metalized with a 0.2μ thick layer or nickel. The fibers have a 6μ diameter, have an average length of 0.50 mm, and a standard deviation of length of 0.02 mm. The metalized fibers are mixed with a low temperature vulcanizable silicone rubber liquid and the mixture is degassed in a vacuum. The volume fraction of cut fibers is 0.5 volume percent.

Into a cavity made of two sheets of polyester film with a 0.5 mm thick aluminum spacer between the polyester sheets, is poured a controlled amount of a mixture so that the thickness of the mixture becomes 0.60 mm. Two sets of polyester sheets (d) and (e) are prepared as described above.

The starting material poured into set (d) is treated in the same way as (b) in Example 1 and a silicone rubber electroconductive sheet (D) is formed therefrom.

However, a special pretreatment is performed on material of set (e). First two pieces of steel plates having a wavy surface on one side are prepared. The pitch and the height of the waves are 12 mm and 6 mm respectively and each wave has a straight edge.

The plates are attached to the opposite poles of an electromagnet. The two plates are set face to face with their wavy surfaces opposed to each other at a distance of 5 mm. The wavy surfaces are opposed to each other so that the tops of the eaves of one plate face the bottoms of the waves of the other plate. The maximum magnetic field generated across the two plates is 2,000 Gauss.

The starting material of set (e) is held on an aluminum plate 1 mm in thickness and is moved to and fro in the space between these two magnetic plates repeatedly crossing the magnetic field emanating from the wavy surfaces. The entanglement of the metalized graphite fibers completely disappears in about 10 minutes. Thereafter, it is treated exactly the same way as (d) so as to form a silicone rubber electroconductive sheet (E).

The effect, as shown in Table 2 of this magnetic pretreatment, is quite beneficial.

TABLE 2

| | Sheet (D) | Sheet (E) |
|---|---|---|
| Appearance of the sheet by the naked eye | Color of sheet is black to gray because of entangled fibers | Almost transparent |
| Appearance of the sheet through a microscope | 15~20/cm$^2$ | 0.0~0.1/cm$^2$ |
| Fibers laying on the surface of the sheet | | |
| Surface conductivity of the sheet (distance between electrode is 0.6 mm) | Irregularly conductive | No conductivity |
| Resistance of the sheet in the direction normal to the sheet, i.e. in the direction of the sheet thickness | 0.23 Ωcm | 0.20 Ωcm |

EXAMPLE 3

Cut steel wires having a 12μ diameter, an average length of 0.49 mm and a standard deviation of length of 0.01 mm are non-electrically metallized with a layer of nickel about 0.6μ in thickness and a layer of gold about 0.08μ in thickness. These wires are mixed with a low temperature vulcanizable liquid silicone rubber and the mixture is degassed in a vacuum. The volume fraction of the fibers in the mixture is 0.12 volume percent.

Into a cavity made by two sheets of 100μ thick polyester film with a 0.47 mm thick aluminum spacer therebetween is poured a controlled amount of the mixture so that the thickness of the mixture becomes 0.60 mm.

Two samples of the starting mixture were prepared in this manner. In preparing one of the samples, the pair of sheets of polyester film is coated with a 30 μm thick nitrilebutadine rubber (f). In the other sample, a pair of sheets of conventional polyester film is used, (g).

These two samples are treated in the same manner as (b) in Example 1 and two kinds of electroconductive sheets (F) and (G) are obtained.

As shown in Table 3 in sheet (F), the ends of the conductive wires protrudes out of the sheet surface, making sheet (F) superior to sheet (G) which has no wire protrusion. The rubber coating on the surface of the polyester sheets in contact with the starting material and the wires is more conclusive to wire protrusion from the electroconductive sheet. The protrusion of the wires from the electroconductive sheet surface provides better conduction through the sheet thickness.

TABLE 3

| | Sheet (F) | Sheet (G) |
|---|---|---|
| Shape of the conductive wires | Straight. Average length of protrusion from the sheet surface is 12 μ | The wires are slightly bent. Protrusion from the surface is not clearly observed |
| Resistance in the normal direction with the electrodes at specific pressures. | | |
| Electrode Pressure | resistance | resistance |
| 1 kg/cm | 0.8 Ω | 3.2 Ω |
| 3 kg/cm | 0.7 Ω | 1.3 Ω |
| 7 kg/cm | 0.7 Ω | 0.9 Ω |
| 13 kg/cm | 0.7 Ω | 1.0 Ω |
| Area of each electrode is 1 mm$^2$ | | |
| Resistance in the normal direction with the sheet at specific temperatures | | |
| Temperature | resistance | resistance |
| 22° C. | 0.7 Ω | 0.9 Ω |
| 50° C. | 0.7 Ω | 1.7 Ω |
| 75° C. | 0.7 Ω | 18 Ω |
| 100° C. | 0.8 Ω | 100 Ω< |
| 125° C. | 1.5 Ω | 100 Ω< |
| Area of each electrode is 1 mm$^2$ Electrode Pressure: is 7 kg/cm$^2$ | | |

EXAMPLE 4

Cut stainless steel wires having a 12μ diameter, an average length of 0.49 mm and a standard deviation of length of 0.01 mm is mixed with a low temperature vulcanizable liquid silicone rubber and the mixture is degassed in a vacuum. The volume fraction of the wires is 0.13 volume percent.

The mixture is poured into a cavity formed by two sheets of 50μ thick polyester film with an aluminum spacer, 0.49 mm in thickness between the sheets. The mixture volume is controlled so that the thickness of the mixture becomes 0.60 mm.

Mold is prepared having two steel plates. The plates are attached to an electromagnetic in the same manner as described in Example 1. However, this time the surface of one plate is engraved so that there are many cylindrical protuberances of 0.1 mm height and 0.2 mm diameter arranged in a hexagonal pattern with a 0.5 mm pitch. This means that the distances from every protuberances to the neighboring six protuberances is equal to 0.5 mm.

The two plates of the mold are each attached to a pole of the electromagnet so that the two plates form the electromagnetic plates and the lower plate has the engraved surface of the topside.

The mold was heated at 60° C. The mixture contained with the sheets was put on the engraved surface and the gap between the two plates was closed to 0.9 mm. Then, the electromagnet was activated to create a 3,000 Gauss magnetic field in the mold cavity. Then the mold was again slowly closed until it was stopped by the spacer. After 40 minutes, the mixture was taken out and further heated 15 minutes in an oven at 150° C. to complete the vulcanization.

In this electroconductive sheet, the conductive wires are all oriented in the direction normal to the sheet and every wire is arranged to form the hexagonal pattern corresponding with the protuberances on the plate. Most of the formed wire groupings include 3 to 5 wires.

We claim:

1. A process for producing an anisotropically electroconductive sheet which comprises;
    (a) mixing magnetic electroconductive wires having a substantially uniform length into a non-electroconductive liquid matrix.
    (b) pouring the mixture into a cavity formed between two parallel planes, the distance between the planes being greater than the length of the electroconductive wires;
    (c) generating a magnetic field in the direction perpendicular to said parallel planes and orienting the electroconductive wires in the matrix to the magnetic field direction then;
    (d) decreasing the distance between said planes to a length not longer than that of the electroconductive wires, and
    (e) hardening the liquid matrix.

2. The process as defined in claim 1, wherein the surfaces of said two planes in contact with said mixture are coated with a layer of a soft, inert material.

3. The process as defined in claim 1, wherein the matrix is a prepolymer of a polymer selected from the group consisting of polyurethane and silicone.

4. The process as defined in claim 1, wherein said electroconductive wires comprise a magnetic metal selected from the group consisting of iron, nickel, cobalt, and an alloy composed of at least one of said metals as a main component.

5. A process as defined in claim 1, wherein said electroconductive wires comprise a non-conductive material coated with a magnetic metal.

6. The process as defined in claim 1, wherein the magnetic field is arranged in a direction at an incline to the normal to the two parallel planes prior to said step (c).

7. The process as defined in claim 6, including the step of varying the inclination of said magnetic field.

8. The process as defined in claim 6, wherein the degree of inclination is at least 5° from the normal.

9. The process as defined in claim 6 wherein, the degree of inclination is at least 10° from the normal.

10. A process for producing an anisotropically electroconductive sheet which comprises:
    (a) mixing a plurality of magnetic electroconductive wires having substantially uniform lengths into a non-electroconductive hardenable fluid matrix;
    (b) maintaining the mixture as a sheet-like form;
    (c) placing a magnetic plate having a multiplicity of protrusions formed on its surface against said sheet-like mixture;
    (d) generating a magnetic field so that the electroconductive wires are caused to gather to the protrusions on the magnetic plate and to be oriented in the thickness direction of the sheet, and
    (e) hardening the fluid matrix.

* * * * *